United States Patent
Shah et al.

(10) Patent No.: US 9,299,386 B2
(45) Date of Patent: Mar. 29, 2016

(54) SYSTEMS AND METHODS FOR PROVIDING ACCESS TO RESOURCES THROUGH ENHANCED AUDIO SIGNALS

(75) Inventors: Mehul Shah, Vadodara (IN); Harshini Ramnath Krishnan, Sunnyvale, CA (US); Neel Goyal, Reston, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 13/570,588

(22) Filed: Aug. 9, 2012

(65) Prior Publication Data

US 2012/0303147 A1    Nov. 29, 2012

Related U.S. Application Data

(63) Continuation of application No. 13/072,528, filed on Mar. 25, 2011, now Pat. No. 8,989,883.

(60) Provisional application No. 61/317,681, filed on Mar. 25, 2010.

(51) Int. Cl.
*G11B 20/00*    (2006.01)
*H04L 29/06*    (2006.01)
(Continued)

(52) U.S. Cl.
CPC .... *G11B 20/00739* (2013.01); *G06F 17/30861* (2013.01); *G06F 21/121* (2013.01);
(Continued)

(58) Field of Classification Search
CPC ...... G06Q 3/02; G06Q 3/06; G06F 17/30861; G06F 21/10; G06F 21/121; G06F 21/16; G10L 19/018; G11B 20/00739; G11B 20/00688; H04L 63/107
USPC .......................................................... 700/94
See application file for complete search history.

(56) References Cited

U.S. PATENT DOCUMENTS 5,213,337 A * 5/1993 Sherman .................. 463/40
5,721,827 A   2/1998 Logan et al.
(Continued)

FOREIGN PATENT DOCUMENTS

EP   2 211 301       7/2010
JP   2002-074163     3/2002
(Continued)

OTHER PUBLICATIONS

Braun et al., "Using Sonic Hyperlinks in Web-TV," Proceedings of the Fifth International Conference on Auditory Displays, ICAD '98 (1998), pp. 1-10 (10 pages).
(Continued)

*Primary Examiner* — Davetta W Goins
*Assistant Examiner* — Daniel Sellers
(74) *Attorney, Agent, or Firm* — MH2 Technology Law Group, LLP (57) ABSTRACT

Systems and methods are provided for using a hidden audio signal. In one exemplary embodiment, the method includes registering, at a central database, one or more of an identifier and a destination resource associated with the identifier, and encoding the one or more of the identifier and the destination resource in a hidden audio signal. The method further includes transmitting the hidden audio signal, including the one or more of the identifier and the destination resource, in connection with an acoustic signal, and receiving the acoustic signal at a user device. In addition, the method includes decoding the encoded one or more of the identifier and the destination resource at the user device; and requesting, from the central database, information associated with the one or more of the identifier and the destination resource. Further, the method includes receiving, at the user device, the requested information.

17 Claims, 5 Drawing Sheets

(51) Int. Cl.
*G06F 21/12* (2013.01)
*G06F 21/16* (2013.01)
*G10L 19/018* (2013.01)
*G06F 17/30* (2006.01)
*G06Q 30/02* (2012.01)
*G06Q 30/06* (2012.01)
*G06F 21/10* (2013.01)

(52) U.S. Cl.
CPC .............. *G06F 21/16* (2013.01); *G10L 19/018* (2013.01); *G11B 20/00688* (2013.01); *G11B 20/00891* (2013.01); *H04L 63/107* (2013.01); *G06F 21/10* (2013.01); *G06Q 30/02* (2013.01); *G06Q 30/06* (2013.01)

(56) References Cited

U.S. PATENT DOCUMENTS

| | | | |
|---|---|---|---|
| 5,841,978 A | | 11/1998 | Rhoads |
| 5,929,849 A | | 7/1999 | Kikinis |
| 5,970,227 A | | 10/1999 | Dayan et al. |
| 6,061,719 A | | 5/2000 | Bendinelli et al. |
| 6,061,793 A | | 5/2000 | Tewfik et al. |
| 6,098,106 A | * | 8/2000 | Philyaw et al. ............... 709/238 |
| 6,226,383 B1 | * | 5/2001 | Jablon ............................ 380/30 |
| 6,385,596 B1 | | 5/2002 | Wiser et al. |
| 6,611,830 B2 | | 8/2003 | Shinoda et al. |
| 6,769,028 B1 | | 7/2004 | Sass et al. |
| 6,785,815 B1 | | 8/2004 | Serret-Avila et al. |
| 6,947,571 B1 | | 9/2005 | Rhoads et al. |
| 6,954,854 B1 | | 10/2005 | Miura et al. |
| 7,003,731 B1 | * | 2/2006 | Rhoads et al. ................ 715/768 |
| 7,310,596 B2 | | 12/2007 | Ota et al. |
| 7,460,684 B2 | | 12/2008 | Srinivasan |
| 7,461,136 B2 | | 12/2008 | Rhoads |
| 7,478,240 B1 | | 1/2009 | August et al. |
| 7,533,266 B2 | | 5/2009 | Bruekers et al. |
| 7,643,652 B2 | | 1/2010 | Srinivasan |
| 7,783,489 B2 | | 8/2010 | Kenyon et al. |
| 7,796,978 B2 | | 9/2010 | Jones et al. |
| 7,849,131 B2 | | 12/2010 | Van de Sluis |
| 7,853,664 B1 | | 12/2010 | Wang et al. |
| 7,945,586 B1 | | 5/2011 | Fang et al. |
| 7,987,245 B2 | | 7/2011 | Rhoads |
| 8,223,932 B2 | | 7/2012 | Forbes et al. |
| 8,667,051 B2 | | 3/2014 | Schneider |
| 2001/0042109 A1 | | 11/2001 | Bolas et al. |
| 2001/0052016 A1 | | 12/2001 | Skene et al. |
| 2002/0042920 A1 | | 4/2002 | Thomas et al. |
| 2002/0062426 A1 | | 5/2002 | Gomez et al. |
| 2002/0073335 A1 | | 6/2002 | Shuster |
| 2002/0078146 A1 | | 6/2002 | Rhoads |
| 2002/0104086 A1 | | 8/2002 | Tomsen et al. |
| 2002/0107693 A1 | | 8/2002 | Thomas |
| 2002/0152388 A1 | | 10/2002 | Linnartz et al. |
| 2002/0186844 A1 | * | 12/2002 | Levy et al. ...................... 380/231 |
| 2003/0103645 A1 | | 6/2003 | Levy et al. |
| 2003/0154073 A1 | | 8/2003 | Ota et al. |
| 2004/0039798 A1 | | 2/2004 | Hotz et al. |
| 2004/0128514 A1 | * | 7/2004 | Rhoads ........................... 713/176 |
| 2004/0210942 A1 | | 10/2004 | Lemmons |
| 2004/0225499 A1 | | 11/2004 | Wang et al. |
| 2005/0028189 A1 | | 2/2005 | Heine et al. |
| 2005/0043940 A1 | | 2/2005 | Elder |
| 2005/0183133 A1 | | 8/2005 | Kelly |
| 2005/0210526 A1 | | 9/2005 | Levy et al. |
| 2005/0219068 A1 | | 10/2005 | Jones et al. |
| 2006/0005029 A1 | * | 1/2006 | Petrovic et al. ............... 713/176 |
| 2006/0062426 A1 | * | 3/2006 | Levy et al. ..................... 382/100 |
| 2006/0199538 A1 | | 9/2006 | Eisenbach |
| 2006/0259302 A1 | | 11/2006 | Lewis et al. |
| 2007/0300066 A1 | | 12/2007 | Srinivasan |
| 2008/0027809 A1 | | 1/2008 | Storm |
| 2008/0060037 A1 | | 3/2008 | Isaacson |
| 2008/0189774 A1 | | 8/2008 | Ansari et al. |
| 2008/0215333 A1 | | 9/2008 | Tewfik et al. |
| 2008/0262928 A1 | * | 10/2008 | Michaelis ........................ 705/14 |
| 2009/0070104 A1 | | 3/2009 | Jones et al. |
| 2009/0074240 A1 | | 3/2009 | Srinivasan |
| 2009/0158318 A1 | | 6/2009 | Levy |
| 2009/0276803 A1 | | 11/2009 | Weaver |
| 2009/0304182 A1 | | 12/2009 | Choi et al. |
| 2010/0042235 A1 | | 2/2010 | Basso et al. |
| 2010/0046795 A1 | | 2/2010 | Srinivasan |
| 2010/0057590 A1 | | 3/2010 | Wesby |
| 2010/0106510 A1 | | 4/2010 | Topchy et al. |
| 2010/0114344 A1 | * | 5/2010 | Hannaby ........................ 700/94 |
| 2010/0223062 A1 | | 9/2010 | Srinivasan et al. |
| 2011/0066437 A1 | | 3/2011 | Luff |
| 2011/0238192 A1 | | 9/2011 | Shah et al. |

FOREIGN PATENT DOCUMENTS

| | | |
|---|---|---|
| JP | 4248193 | 1/2009 |
| JP | 2009-296155 | 12/2009 |
| JP | 4845683 | 10/2011 |
| JP | 4855589 | 11/2011 |
| JP | 4899416 | 1/2012 |
| WO | 96/41468 A1 | 12/1996 |
| WO | WO 2005/008582 | 1/2005 |
| WO | WO 2005/064561 | 5/2009 |
| WO | WO 2009/126164 | 10/2009 |
| WO | WO 2010/048458 | 4/2010 |
| WO | WO 2010/048459 | 4/2010 |

OTHER PUBLICATIONS

Cho et al., "Robust Data Hiding for MCLT Based Acoustic Data Transmission," IEEE Signal Processing Letters, vol. 17, No. 7, Jul. 2010, pp. 679-682 (4 pages).

Cox et al., "Secure Spread Spectrum Watermarking for Multimedia," IEEE Trans. on Image Processing vol. 6, No. 12, 1997, pp. 1673-1687 (31 pages).

International Search Report and Written Opinion, mailed May 23, 2011, in corresponding International Patent Application No. PCT/US11/30045 (8 pages).

Matsuoka et al., "Acoustic Communication System Using Mobile Terminal Microphones," Technology Reports, NTT DoCoMo Technical Journal, vol. 8, No. 2, pp. 4-12 (9 pages).

Yun et al., "Acoustic Data Transmission Based on Modulated Complex Lapped Transform," IEEE Signal Processing Letters, vol. 17, No. 1, Jan. 2010, pp. 67-70, (4 pages).

Final Office Action dated Oct. 28, 2013, U.S. Appl. No. 13/538,604, filed Jun. 29, 2012, 41 pages.

Non-Final Office Action dated Sep. 3, 2013, U.S. Appl. No. 13/836,682, filed Mar. 15, 2013, pp. 1-40.

Jeff Tyson, "How Encryption Works", howstuffworks.com, Dec. 6, 2005, retrieved from Wayback Machine, http://web.archive.org/web/20051206043803/http://computer.howstuffworks.com/encyrption.htm/printable, pp. 1-4.

Extended European Search Report dated Jun. 26, 2014, European Application No. 14159613.0 filed Mar. 13, 2014, pp. 1-8.

Non-Final Office Action dated Aug. 26, 2014, U.S. Appl. No. 13/836,682 filed Mar. 15, 2013, pp. 1-39.

Ingemar Cox et al., "The First 50 Years of Electronic Watermarking", EURASIP Journal on Applied Signal Processing, 2002, pp. 126-132.

Notice of Allowance and Fees Due dated Nov. 13, 2014, U.S. Appl. No. 13/072,528, filed Mar. 25, 2011, pp. 1-23.

Extended European Search Report dated Dec. 22, 2014, European Application No. 11760337.3, pp. 1-8.

Non-Final Office Action dated Dec. 31, 2014, U.S. Appl. No. 13/538,604, pp. 1-26.

* cited by examiner

SYSTEMS AND METHODS FOR PROVIDING ACCESS TO RESOURCES THROUGH ENHANCED AUDIO SIGNALS

PRIORITY

This application is a continuation of U.S. patent application Ser. No. 13/072,528, filed Mar. 25, 2011, now U.S. Pat. No. 8,989,883 which claims the benefit of U.S. Provisional Application No. 61/317,681, filed Mar. 25, 2010. All prior applications are incorporated by reference herein in their entirety for any purpose.

TECHNICAL FIELD

The present disclosure relates generally to systems and methods for providing resources and resource identifiers to user devices via enhanced audio signals.

BACKGROUND

Mobile computer devices and smart phones have become more prevalent and ubiquitous with advances in electronics, communications and data networks, availability of access to resources, and decreased costs. As a result, increasing numbers of the population have access to personal electronic devices who, in turn, require a large range of mobile applications and access to cellular telephone networks and the Internet. In an attempt to enhance a user experience and simplify navigation, various tools have been suggested. Printed labeling or advertising, for example, may include one-dimensional (e.g., Universal Product Code (UPC), etc.) or matrix barcodes (e.g., QR Codes, etc.) readable by dedicated barcode readers, camera phones, etc., to direct a user to a resource. A product or associated signage may include a Uniform Resource Locator (URL) within the barcodes that, when read by an optical scanning application, prompts a browser client to retrieve related information from the URL or access product information from a webpage identified by the URL.

Such techniques, however, rely on printed bar codes and optical scanning to obtain information. In some kinds of communication media, such as television or other video presentation, it may be difficult or impractical to encode information within bar codes or other optical patterns for scanning, since the clarity or resolution necessary for scanning devices to decode such patterns may be lacking. Moreover, such optical techniques are not applicable to non-visual communication media, such as radio or other audio or signal media.

Therefore, there is a need to provide digital information capable of resolution by a user device through signals, such as, for example, audio signals, and provide various mechanisms by which user devices may access resources associated with the digital information, whether directly or with the assistance of a separate resolution server.

The disclosed embodiments address one or more of the problems set forth above.

SUMMARY

In one exemplary embodiment, the present disclosure is directed to a method providing a resource through an audio signal, comprising: generating an enhanced audio signal, the enhanced audio signal encoding resource identifier data, wherein the resource identifier data represents a resource identifier associated with a resource; and transmitting the enhanced audio signal to one or more user devices.

In another exemplary embodiment, the present disclosure is directed to a computer-implemented method for accessing a resource specified by an audio signal, comprising: receiving an enhanced audio signal, the enhanced audio signal encoding resource identifier data, wherein the resource identifier data represents a resource identifier associated with a resource; detecting the resource identifier data within the enhanced audio signal; extracting the resource identifier from the resource identifier data; and retrieving the resource identified by the resource identifier.

In another exemplary embodiment, the present disclosure is directed to a computer-implemented method for providing access to a resource specified by an audio signal, comprising: receiving a first request from a first device to register a resource or resource identifier; registering the resource or resource identifier in a database; generating an index identifier corresponding to the resource or resource identifier; sending the index identifier to the first device for encoding within an audio signal; receiving a second request from a second device for the resource or resource identifier, wherein the second request includes the index identifier; and sending the resource or resource identifier or information for accessing the resource to the second device.

In another exemplary embodiment, the present disclosure is directed to an apparatus for providing a resource through an audio signal, comprising: at least one memory to store data and instructions; and at least one processor configured to access the at least one memory and, when executing the instructions, to: generate an enhanced audio signal, the enhanced audio signal encoding resource identifier data, wherein the resource identifier data represents a resource identifier associated with a resource; and transmit the enhanced audio signal to one or more user devices.

In another exemplary embodiment, the present disclosure is directed to an apparatus for accessing a resource specified by an audio signal, the apparatus comprising: at least one memory to store data and instructions; and at least one processor configured to access the at least one memory and, when executing the instructions, to: receive an enhanced audio signal, the enhanced audio signal encoding resource identifier data, wherein the resource identifier data represents a resource identifier associated with a resource; detect the resource identifier data within the enhanced audio signal; extract the resource identifier from the resource identifier data; and retrieve the resource identified by the resource identifier.

In another exemplary embodiment, the present disclosure is directed to an apparatus for accessing a resource specified by an audio signal, the apparatus comprising: at least one memory to store data and instructions; and at least one processor configured to access the at least one memory and, when executing the instructions, to: receive an enhanced audio signal, the enhanced audio signal encoding resource identifier data, wherein the resource identifier data represents a resource identifier associated with a resource; detect the resource identifier data within the enhanced audio signal; extract the resource identifier from the resource identifier data; and retrieve the resource identified by the resource identifier.

BRIEF DESCRIPTION OF THE DRAWINGS

The accompanying drawings, which are incorporated in and constitute a part of this disclosure, illustrate aspects consistent with the present disclosure and, together with the description, serve to explain advantages and principles of the present disclosure. In the drawings.

DETAILED DESCRIPTION

Embodiments of the systems and methods described herein enable a user to access a resource identified by data contained in an audio signal transmitted to a user device. The audio signal may be in the form of an acoustic or sound wave or a radio or other electromagnetic wave, for example. The audio signal may be audible, partially inaudible, or wholly inaudible to humans, while the data may be carried by or embedded in the audio signal using any number of methods or techniques, including, for example, digital watermarking or digital fingerprinting. For example, resource identifier data representing or pointing to a resource may be superimposed on an audio signal by appropriate modulation of the audio signal such that the resource identifier data is conveyed by and/or hidden within the audio signal. In one embodiment, the resource identifier may be encoded as an inaudible (to humans) data-carrying component that is added to an audio signal carrying musical content for user consumption. While the disclosed embodiments discuss encoding resources and/or resource identifiers in audio data, the embodiments may encompass encoding resources and/or resource identifiers in video or other data, whether analog and/or digital.

In either case, binary or other digitized data representing one or more resource identifiers may be captured from the audio signal by a user device to reference one or more resources or actions. Resource identifiers may identify resources directly, such as, for example, e.g., by internet protocol (IP) (e.g., IPv4, IPv6, etc.) or other network address, hostname or domain name, Uniform Resource Identifier (URI), Uniform Resource Number (URN), or URL, phone number, email address, a text message, an image file, a Short Message Service (SMS) location, a Multimedia Message Service (MMS) location etc. By way of example, and not limitation, other resources may include Media Access Control (MAC) addresses, Ethernet Hardware Address (EHA) addresses, Bluetooth addresses, an International Mobile Subscriber Identity (IMSI), a subscriber identity module or subscriber identification module (SIM), a Removable User Identity Module (R-UIM), an Internet eXchange (IPX), X.25, BLNA, a Global Positioning System (GPS) coordinate, or any other type of identifier. Resource identifiers may also include instructions for performing some action, such as, for example, receiving email, forwarding or sending email, deleting email, exchanging email, using other messaging protocols, such as, Post Office Protocol (POP), Internet Message Access Protocol (IMAP), Simple Mail Transfer Protocol (SMTP), or otherwise manipulating email or other messages, whether occurring in the link layer, internet layer, transport layer, or application layer.

Or, resource identifiers may identify resource indirectly by, for example, specifying indexes or pointers to a separate database that contains further information about how to access the referenced resources. In some embodiments, the indexes may be a single or multibit indexes into the separate databases. In other embodiments, the indexes may be unique data strings that serve as indexes into the separate databases. The separate database may be provided by a third-party resolution service provider or resolution server. For example, an audio signal may embed a first URL as a resource identifier, the first URL pointing to a resolution server. Upon detecting the first URL in the audio signal, a user device may make an HTTP request to the resolution server, using the first URL, which may contain path or other data uniquely identifying the resource or resource identifier to the resolution server. The resolution server may then respond to the HTTP request by transmitting a second URL to the user device, the second URL pointing to a resource, such as a webpage, that the user device may then retrieve using the second URL.

In still other embodiments, resource identifiers may identify resources via a computer algorithm or logic capable of execution on the user device, for example via particular software installed on the user device in the form of an application, widget, or native software. Data embedded within the audio signal may further include information that may be used to authenticate the resource identifiers or resources, such as a Secure Sockets Layer (SSL) certificate or other encryption keys.

Embodiments of the systems and methods described herein may further request user confirmation prior to initiating an action and/or may provide options for how the user would prefer to take various actions, such as accessing a website, providing user location information, etc. Other embodiments include additional features and functionality such as including GPS-derived geolocation information as part of a Hypertext Transfer Protocol (HTTP) request sent to a resource provider so as to request a location-appropriate response, such as a request for the location of facilities nearest the requesting user, web pages in a language corresponding to the geolocation of the user, etc.

The disclosed embodiments provide a variety of benefits and features, such as improved user experience, seamless navigation to a destination relevant to consumer content, seamless direction of users to specific sites for marketing purposes, effective measurement of the impact of advertising, one-to-one direct response mechanisms for mass media broadcast advertising, and other benefits.

The following detailed description refers to the accompanying drawings. Wherever possible, the same reference numbers will be used throughout the drawings and the following description to refer to the same or like parts. While several exemplary embodiments and features are described herein, modifications, adaptations, and other implementations are possible, without departing from the spirit and scope of the disclosure. For example, substitutions, additions or modifications may be made to the components illustrated in the drawings, and the exemplary methods described herein may be modified by substituting, reordering or adding steps to the disclosed methods. Accordingly, the following detailed description is not intended to limit the disclosure to any specific embodiments or examples.

In some embodiments, an "audio signal" may refer to a signal that may be at least partially embodied in an acoustic signal, although the acoustic signal may be encoded within or decoded from a corresponding electronic or electromagnetic signal (e.g., digital, analog, or any combination thereof).

As one example, a digital audio signal may be processed, amplified, and supplied to an appropriate transducer such as a loudspeaker so as to generate a corresponding audible or inaudible (as to humans) sound wave or acoustic signal. In some embodiments, the acoustic signal may be transmitted in a region and detected by another device, such as a cellular telephone, smart phone, or other device having a microphone or other input means to detect and process an audio signal, which may include conversion of the audio signal into an electronic audio signal or other digital or electronic data.

In other embodiments, the audio signal may be received directly by an electronic device or system, such as a television, radio, smart phone, or other electromagnetic signal receiving device. The device may process the electronic signal and produce one or more acoustic signals at one or more frequencies. In other embodiments, the device may process the audio signal to recover data so that it may take some further action. For example, the device may process the audio signal, and then transmit the decoded data for further processing, such as by sending the decoded data to a separate resolution server via the Internet so that a URL or an IP address can be obtained.

In some embodiments, an "enhanced" audio signal may refer to an audio signal that, in addition to encoding audio content data for consumption by users, also includes resource identifier data that may be used to retrieve or identify a resource or action, such as a webpage, a URI, a URL, or a URN for a website or other resource, an email address, a text message, an image file, an SMS location, a MMS location, etc. The resource identifier data may be encoded within the audio signal such that its auditory effect on the audio content data otherwise encoded within the audio signal is partially or entirely non-perceptible by a human user, non-comprehensible by a human user, or both.

Resource identifier data may be encoded within the audio signal in a "non-perceptible" manner by virtue of being associated with a frequency range at which humans are typically unable to perceive sound (e.g., below 20 Hz or above 20 kHz). Resource identifier data may be encoded within the audio signal in a "non-comprehensible" manner such that, while a user may perceive sound associated with the encoding of the resource identifier data, the user could not, or would not be expected to, perceive or understand the resource identifier data itself or the significance of the resource identifier data within the sound. For example, resource identifier data encoded within the audio signal in a non-comprehensible manner may be perceived by the user as a constant tone, random noise, or a sound just at the edge of the user's hearing, but without the user understanding any information conveyed by or encoded in the sound.

In some embodiments, a sound associated with resource identifier data encoded within an audio signal may be perceptible and at least partially comprehensible by a user, but not for purposes of identifying or understanding the encoded resource data. For example, an audio signal may include a series of tones at frequencies that a user can hear, but the user may not be able to determine that the signal includes resource identifier data encoded in the signal. As a specific example, a theme song or commercial "jingle" may be used to direct a user's device to a website or other resource associated with the song, such as, for example, a website for the advertised product, a telephone number at which a prerecorded message can be heard, etc. Thus the acoustic signal perceived by the user may be a combination of an intelligible audio component, such as speech, and a non-comprehensible audio component encoding resource identifier or other data that is primarily or solely machine-readable or machine-intelligible. In this embodiment, the distinctive sound may be identified (e.g., by fingerprinting) and associated with one or more resources to be accessed and/or actions to be initiated.

Resource identifiers may comprise pre-registered unique identifiers that allow user devices to retrieve specific resources related to the human-comprehensible content of the audio signal. A resource identifier may be, for example, an identifier that has previously been associated with a URI, URL, and/or URN of a website or other resource on a separate resolution server, or it may be a URI, URL, URN or another representation of the resource itself.

A resource or resource identifier may be registered with a central database, such as a resolution server or resource provider server, by an entity broadcasting or publishing the content or a portion of the content, such as an advertiser that provides advertisements for presentation or broadcast during other content. For example, a resource may provide the user further details about the content being consumed and/or may facilitate a marketing or public service campaign. In some embodiments, the resource may be updated without a need to update and/or change the resource identifier. That is, the association between a given resource identifier and a resource may be updated to reflect a change in the resource to which the resource identifier points.

Figure 1:
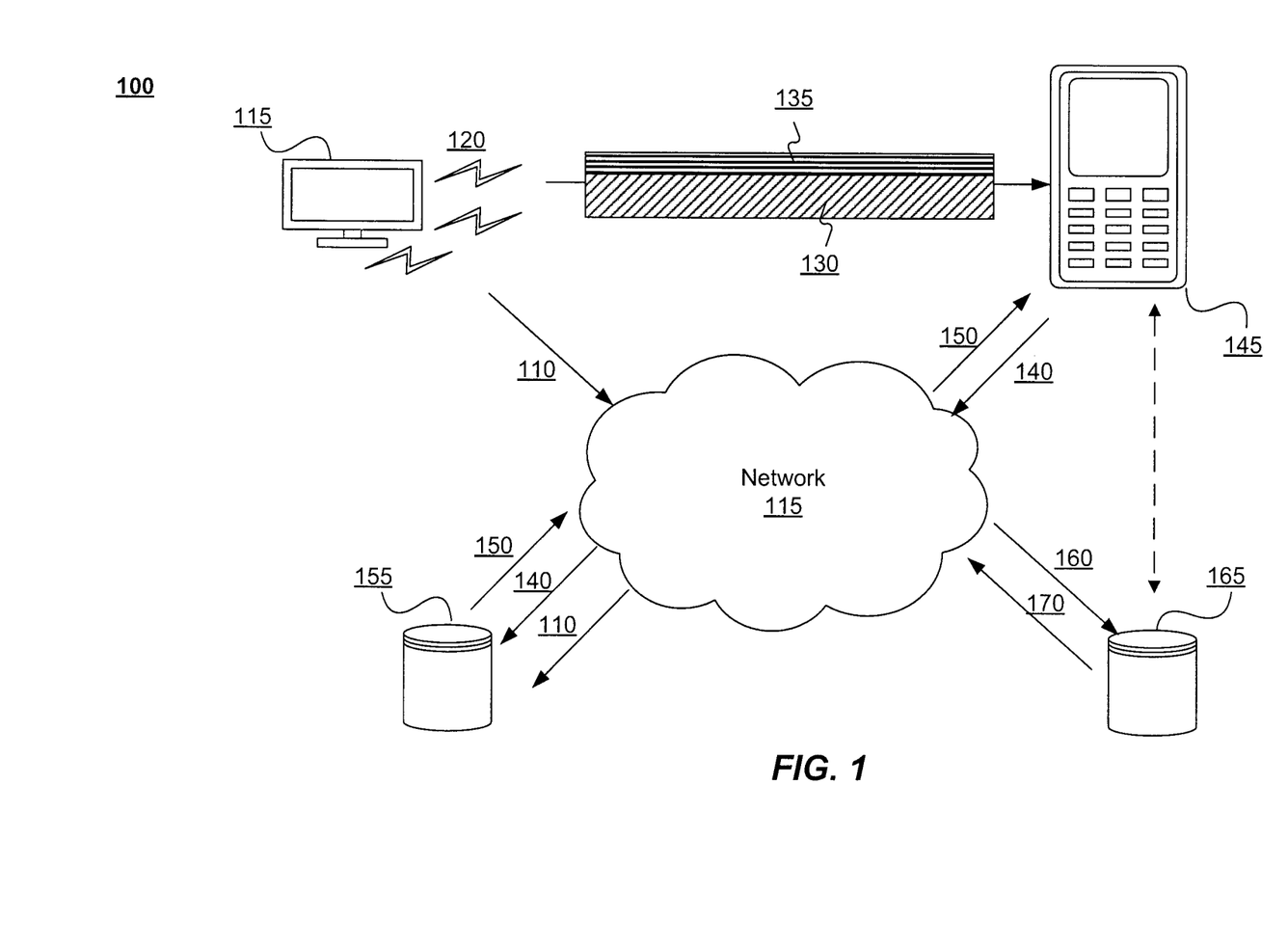
FIG. 1 illustrates an example of registering and using a resource identifier in an enhanced audio signal transmitted in connection with a television signal, consistent with certain disclosed embodiments.

FIG. 1 depicts an exemplary system and process for using an enhanced audio signal to provide access to a resource. In FIG. 1, an enhanced audio signal is transmitted in connection with a television broadcast. Although a television broadcast is disclosed in the example of FIG. 1, the systems and methods disclosed herein may be incorporated in any form of audio signal, such as, for example, radio signals, streaming signals, pre-recorded audio signals, etc. In addition, the systems and methods disclosed herein may be employed in an audio signal that is selectively broadcast to a specific group of people such as, patrons at a sales kiosk, an information terminal (e.g., airport flight arrival and departure display), or a shopping mall or other large area that might typically provide background music or include, for example, a public address system.

Referring to FIG. 1, resource information such as a URL, a domain name, or other resource information may be registered (element 110) with one or more central databases or other registries, such as a resolution server (element 155) via a network (element 115). A unique identifier associated with the resource information also may be registered in the one or more central databases or registries. For example, a domain name or URL may be registered with the one or more central databases or registries and associated with a resource identifier or other identifier encoded in an enhanced audio signal. In some embodiments, the resource identifier itself may be a domain name or a URL.

Still referring to FIG. 1, after the resource identifier is registered with one or more central databases or registries, an enhanced audio signal may be created and the resource identifier embedded, encoded, or otherwise incorporated into the audio signal and broadcast (element 120) by a television or television signal broadcaster (element 115). As illustrated in FIG. 1, the embedded or encoded signal (element 135) may form a smaller portion of the audio signal relative to the portion of the audio signal that contains content for normal user consumption (element 130), such as music, speech, or other human-perceptible and/or -comprehensible audio content. Various techniques of incorporating information into an audio signal are known in the art, and the use of appropriate techniques to incorporate the identifier into an enhanced audio signal will be readily understood by those skilled in the art.

The enhanced audio signal may then be transmitted to one or more user devices, such as during or as part of a TV, radio, or other multicast signal or by a TV, radio, or other device. That is, the enhanced audio signal may comprise the radio or other electromagnetic waves transmitted by a device, such as a broadcast device, or an acoustic representation of the electromagnetic signal produced by a receiving device, such as a television or radio. In the former scenario, a user device may receive the electromagnetic signal directly from the broadcasting device, and may extract one or more resource identifiers from the electromagnetic signal. In the latter scenario, a user device may receive the acoustic sound waves from the electromagnetic signal-receiving device, such as a television or radio, and may extract one or more resource identifiers from the acoustic sound waves.

In either case, resource identifier data may be provided within the same audio signal that contains audio content for user consumption or may be transmitted in a separate audio signal concurrently with the "primary" audio signal that contains the user content. A user may activate an application, such as a software application, on the user device (element 145) to access the enhanced audio signal (elements 130 and 135). For example, a user watching a TV broadcast may activate an application on the user device to obtain additional information about the content of the broadcast, access a related website or other resource, etc.

As a specific example, the user may activate an application on a smart phone, personal computer, or other similar device by entering a predefined sequence (e.g., #555) or actuating a button on the device. The user may be informed of the presence of the enhanced audio signal such as by regular announcements on the channel the user is watching, signs or announcements in a location such as a shopping mall or airport, or any other suitable mechanism. Alternatively, a device may be operated in a monitoring mode to detect electromagnetic or acoustic signals including an enhanced audio signal component, the device alerting the user to the presence of data such as the availability of additional information provided by the audio signal, such as an informational website designated, a telephone number, etc.

When the user activates the application, the application may receive the enhanced audio signal and may access or decode one or more resource identifiers embedded within the signal. The application or device may then access the resources specified by the one or more resource identifiers, such as by downloading a webpage or file, sending a text message, making a phone call, etc. For example, the resource identifier may comprise a URL in the form of "http://www.momandpopshop.com/deals/promotions/winter_sale_coupon.html". Upon detecting this URL resource identifier, the application or device may make an HTTP request 160 to resource provider server 165 for the resource associated with the URL "http://www.momandpopshop.com/deals/promotions/winter_sale_coupon.html", which may be provided to device 145 in an HTTP response 170 in the form of an HTML file representing a webpage.

Alternatively, the application or device may send a request that includes the one or more resource identifiers, or a portion or portions thereof, to the one or more central databases or other registries made available by a resolution server 155, which in turn may respond to the application or device by sending information on how to access the resources associated with the resource identifiers from one or more resource providers (element 150).

For example, the resource identifier may comprise a URL in the form of "http://www.resolvecom.com/resolve.aspx?resource_id=0702021308220624", the domain name of which may be hosted by resource provider 155. The application or device may extract this resource identifier/URL from the enhanced audio signal. The application or device may then send an HTTP request 140 to resolution server 155, specifying the URL "http://www.resolvecom.com/resolve.aspx?resource_id=0702021308220624". The resolution server 155 may then look up information about the resource associated with the unique identifier "0702021308220624" in a database or other memory structure, which may reveal that the requested resource may be retrieved using the URL "http://www.momandpopshop.com/deals/promotions/winter_sale_coupon.html".

Thus, resolution server 155 may send an HTTP response 150 to device 145 that includes the URL "http://www.momandpopshop.com/deals/promotions/winter_sale_coupon.html". Upon receiving this information about how to access the requested resource associated with the resource identifier, device 145 may make an HTTP request 160 to resource provider server 165 for the resource associated with the URL "http://www.momandpopshop.com/deals/promotions/winter_sale_coupon.html", which may be provided to device 145 in an HTTP response 170 in the form of an HTML file representing a webpage.

Resolution server 155 may also record a history of requests from particular devices and/or users in order to build profiles that can be used to better target information to users.

A resource identifier may be embedded within in an audio signal in a variety of ways, such as digital watermarking or digital fingerprinting. For example, "digital watermarking" is the process of embedding information into a digital signal in a way that is difficult to remove, i.e., if the signal is copied then the information is also contained in the copy. In an embodiment, one or more resource identifiers or frequencies (i.e., watermarks) may be embedded in the content being consumed to enable the broadcaster to point the user to a particular destination. That is, the resource identifier included in the enhanced audio signal may be embedded in the form of a watermark applied to the signal, or may be otherwise related to or derivable from such a watermark.

As another example, "fingerprinting" is a technique in which software or hardware identifies, extracts, and then compresses characteristic components of a signal, enabling that signal to be uniquely identified by its resultant "fingerprint." Content providers and other identifiers as described herein may leverage the concept of fingerprinting, especially for pre-recorded content. For example, URLs or other resource identifiers may be encoded within a fingerprint of an audio signal. When a user device receives the audio signal, it may calculate or extract the fingerprint using the same technique that was used to create the fingerprint initially, and look up the resource identifier based on the fingerprint.

An exemplary resource may include one or more web pages that are identified based on a URL. In such an embodiment, the URL may be the identifier included in an enhanced audio signal. As another exemplary destination resource, in cases when the user's device is not connected to the Internet, such as where a user's mobile device does not subscribe to a data plan, the device may be directed to a pre-configured phone number. For example, a software application on the device may communicate with one or more central databases or registries, such as a resolution server, via text messaging, such as, SMS, MMS, etc., after which a response from the central database may prompt the device to call a phone number provided by the central database.

Other exemplary resources may include a file, folder, or other item stored on the device performing detection of the enhanced audio signal. For example, if the application is designed to receive discount coupons as a user walks into a shopping mall based on an enhanced audio signal being transmitted in the mall, the device may detect the identifier in the music being played in the store and accept the relevant digital coupons being transmitted by, for example, the public address system in the mall. The coupons may be stored on the device, thus making the destination resource a storage space on the device.

Figure 2:
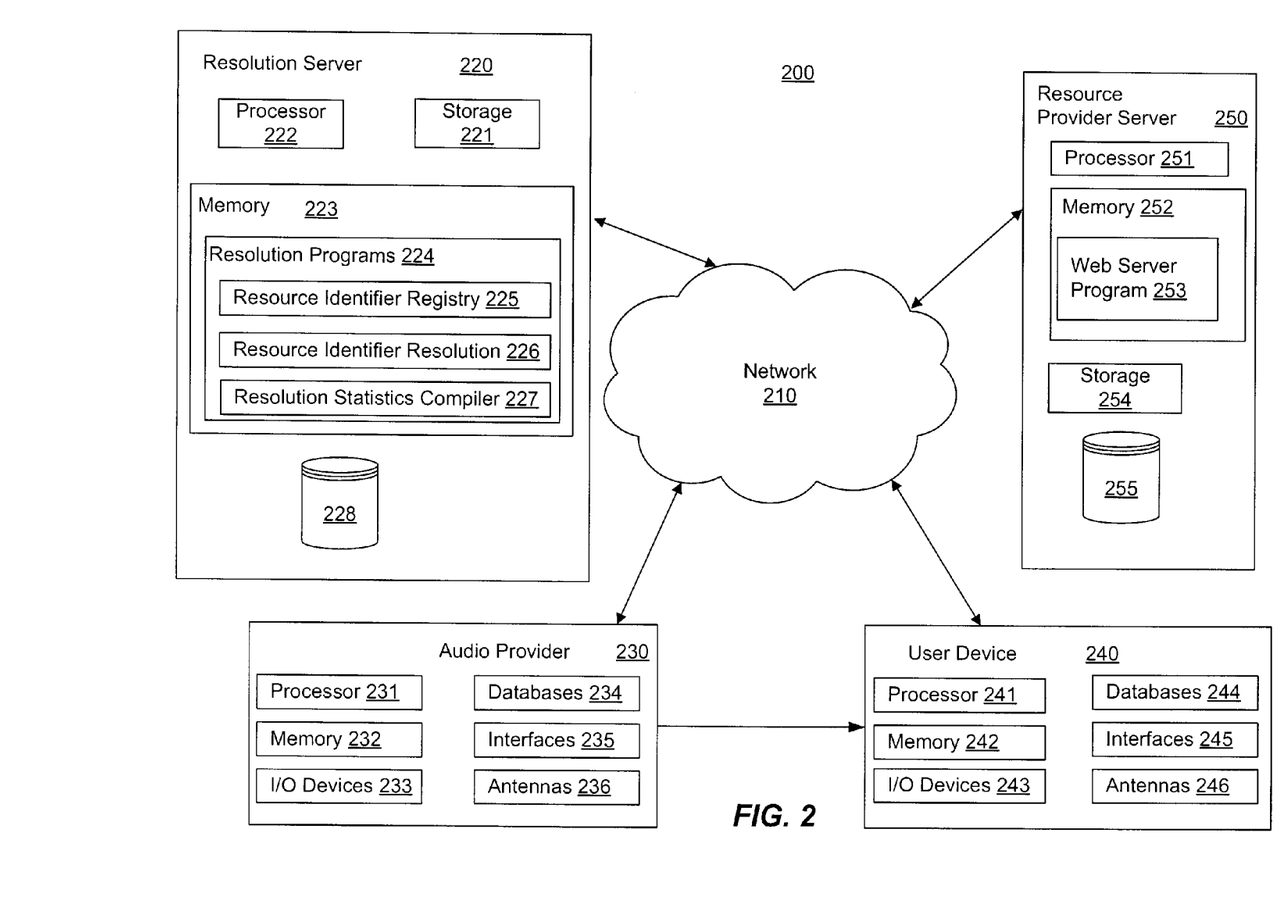
FIG. 2 illustrates an example system for registering and using a resource identifier in an enhanced audio signal, consistent with certain disclosed embodiments.

FIG. 2 is a diagram illustrating an exemplary system 200 that may be used to implement disclosed embodiments, including exemplary system components. The components and arrangement, however, may be varied. Exemplary system 200 of FIG. 2 may include network 210, resolution server 220, audio provider 230, resource provider server 250, and user device 240. Resolution server 220 may include a processor 222, a memory 223, input/output (I/O) devices (not shown), and storage 221. Resolution server 220 may be implemented in various ways. For example, resolution server 220 may be a general purpose computer, a server, a mainframe computer, or any combination of these components. Resolution server 220 may communicate over a link with network 210. For example, the link may be a direct communication link, a LAN, a WAN, or other suitable connection. Network 210 may, for example, include the Internet or telephony network. Resolution server 220 may be standalone or it may be part of a subsystem, which may, in turn, be part of a larger system, such as a legacy domain registration system.

Memory 223 may include one or more storage devices configured to store information used by processor 222 to perform certain functions related to the disclosed embodiments. Storage 221 may include a volatile or non-volatile, magnetic, semiconductor, tape, optical, removable, non-removable, or other type of storage device or computer-readable medium. In one embodiment, memory 223 may include one or more resolution programs or subprograms 224 loaded from storage 221 or elsewhere that, when executed by resolution server 220, perform various procedures, operations, or processes consistent with disclosed embodiments. Memory 223 may be also be configured with an operating system (not shown) that performs several functions well known in the art when executed by resolution server 220. The choice of operating system, and even to the use of an operating system, is not critical to any embodiment.

Memory 223 may also include a resource identifier registry program 225 for registering resources or resource identifiers, a resource identifier resolution program 226 for mapping index identifiers to resource identifiers, and a resolution statistics compiler 227 for building user profiles based on resources requested by users. Resolution server 220 may include one or more I/O devices (not shown) that allow data to be received and/or transmitted by resolution server 220. I/O devices may also include one or more digital and/or analog communication input/output devices that allow resolution server 220 to communicate with other machines and devices. The configuration and number of input and/or output devices incorporated in I/O devices may vary as appropriate for certain embodiments.

Resolution server 220 may also be communicatively connected to one or more data repositories 228. Data repository 228 may include one or more files or one or more relational and/or non-relational databases that store information and are accessed and/or managed through resolution server 220. The databases or other files may include, for example, data and information related to registered resources and resource identifiers, index identifiers, and mappings therebetween, as well as user profile data based on previous user requests.

As shown in FIG. 2, each audio provider 230 may include one or more of the following components: at least one processor 231 configured to execute computer program instructions to perform various processes and methods, at least one memory device 232 configured to access and store information and computer program instructions, I/O devices 233, databases 234 to store tables, lists, or other data structures, interfaces 235, antennas 236, etc. Each of these components is well-known in the art and will not be discussed further.

As also shown in FIG. 2, each user device 240 may include one or more of the following components: at least one processor 241 configured to execute computer program instructions to perform various processes and methods, at least one memory device 242 configured to access and store information and computer program instructions, I/O devices 243, databases 244 to store tables, lists, or other data structures, interfaces 245, antennas 246, etc. Although not shown, each user device 240 may include one or more programs configured to access network 210, and display information received via network 210 via a browser, such as a web browser. Each of these components is well-known in the art and will not be discussed further.

Resource provider server 250 may include a processor 251, memory 252, input/output (I/O) devices (not shown), and storage 254. Resource provider server 250 may be implemented in various ways. For example, resource provider server 250 may be a general purpose computer, a server, a mainframe computer, or any combination of these components. Resource provider server 250 may communicate over a link with network 210. For example, the link may be a direct communication link, a LAN, a WAN, or other suitable connection. Resource provider server 250 may be standalone or it may be part of a subsystem, which may, in turn, be part of a larger system, such as a legacy domain registration system.

Memory 252 may include one or more storage devices configured to store information used by processor 251 to perform certain functions related to the disclosed embodiments. Storage 254 may include a volatile or non-volatile, magnetic, semiconductor, tape, optical, removable, non-removable, or other type of storage device or computer-readable medium.

In one embodiment, memory 252 may include one or more web server programs or subprograms 253 loaded from storage 254 or elsewhere that, when executed by resource provider server 250, perform various procedures, operations, or processes consistent with disclosed embodiments. Memory 252 may be also be configured with an operating system (not shown) that performs several functions well known in the art when executed by resource provider server 250. The choice of operating system, and even to the use of an operating system, is not critical to any embodiment. Web server program 253 may be configured to register resources or resource identifiers, map index identifiers to resource identifiers, and build user profiles based on resources requested by users.

Resource provider server 250 may include one or more I/O devices (not shown) that allow data to be received and/or transmitted by resource provider server 250. I/O devices may also include one or more digital and/or analog communication input/output devices that allow resource provider server 250 to communicate with other machines and devices. Resource provider server 250 may receive data from external machines and devices and output data to external machines and devices via I/O devices. The configuration and number of input and/or output devices incorporated in I/O devices may vary as appropriate for certain embodiments.

Resource provider server 250 may also be communicatively connected to one or more data repositories 255. Data repository 255 may include one or more files or relational and/or non-relational databases that store information and are accessed and/or managed through resource provider server 250. The databases or other files may include, for example, data and information related to registered resources and resource identifiers, index identifiers, and mappings therebetween, as well as user profile data based on previous request user requests.

Figure 3:
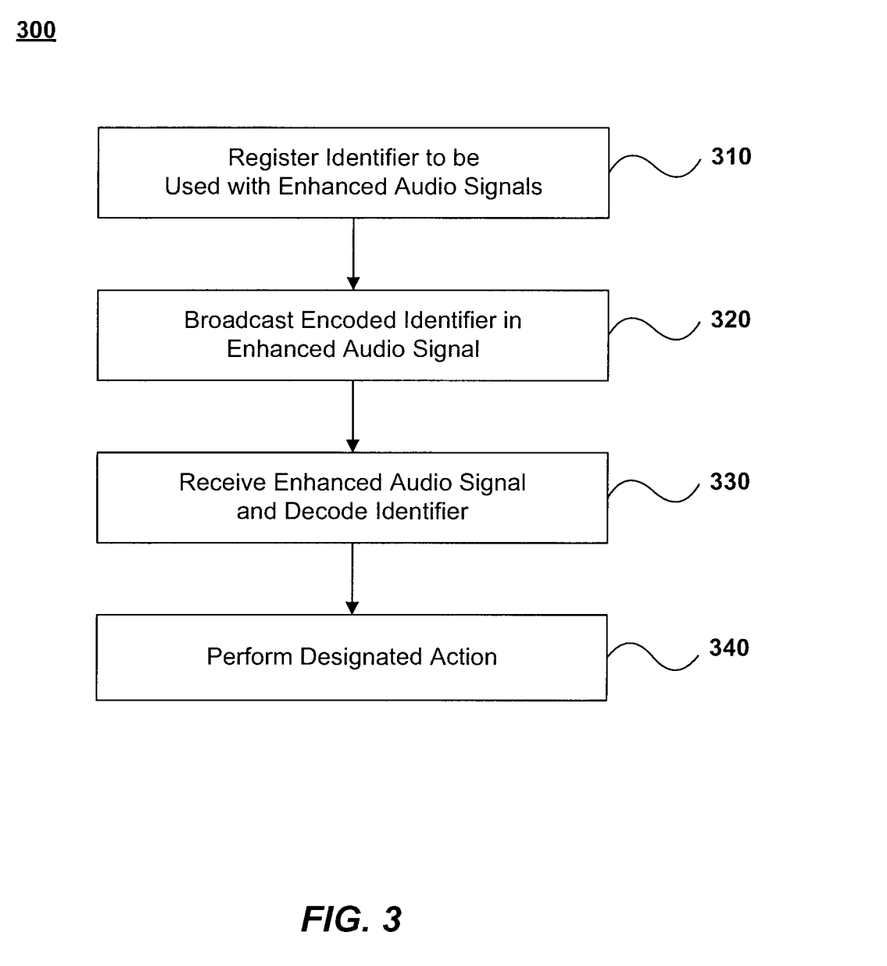
FIG. 3 illustrates an example of a process for registering and using resources and resource identifiers in an enhanced audio signal, consistent with certain disclosed embodiments.

FIG. 3 presents an exemplary flow chart 300 illustrating a method of registering and using one or more resource identifiers in an enhanced audio signal. In the embodiment presented in FIG. 3, a domain name or similar resource identifier may be transmitted to a user device via an enhanced audio signal. In FIG. 3, one or more resource identifiers, such as, for example, a domain name, that is to be used with an enhanced audio signal, may be registered in a central database (310). An enhanced audio signal, such as an electromagnetic signal or acoustic waves, encoding the one or more resource identifiers is broadcast or otherwise transmitted to a user device (320). A user device, such as, for example, a smart phone, detects the enhanced audio signal and extracts and/or decodes the embedded one or more resource identifiers (330). The user device may perform some appropriate and/or designated action (340) associated with the one or more embedded resource identifiers, such as, for example, initiating and running an appropriate application in response to the one or more resource identifiers, requesting a network resource such as a webpage corresponding to the resource identifier, sending an email, calling a telephone number, etc.

Figure 4:
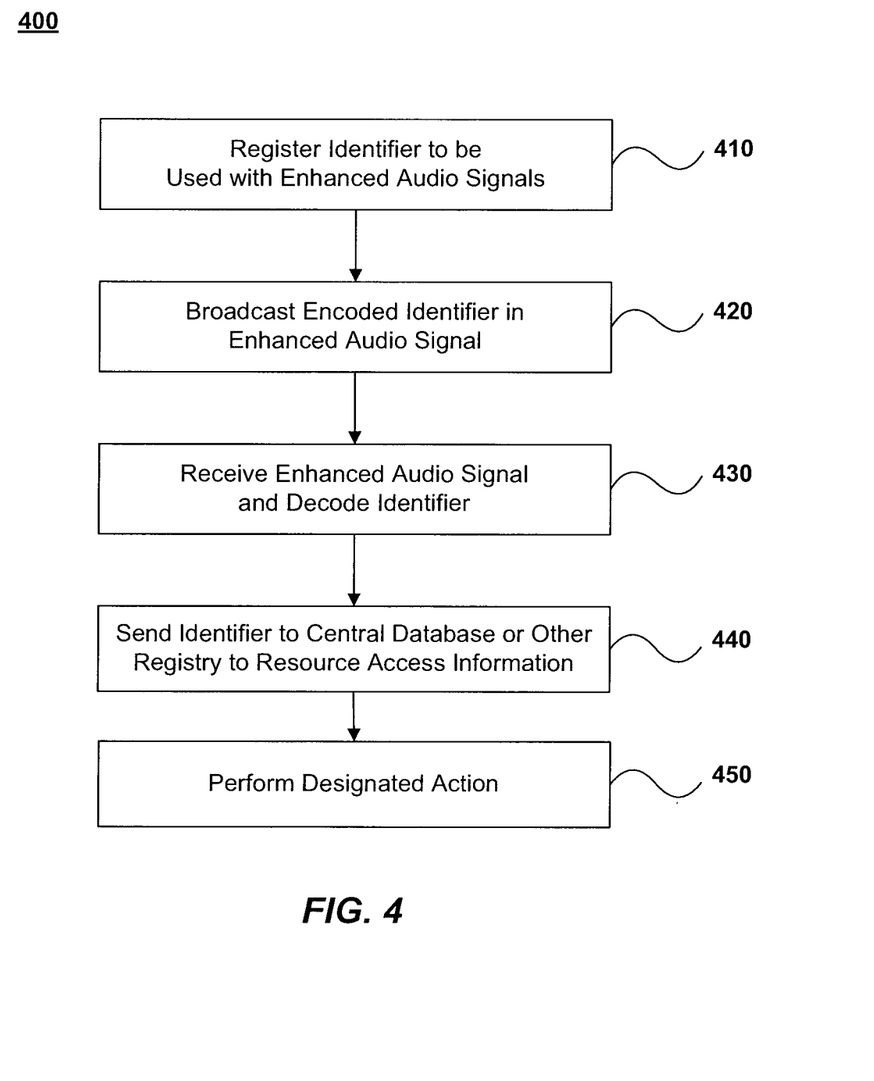
FIG. 4 illustrates an example of a process for registering and using resources and resource identifiers to be used in enhanced audio signals, consistent with certain disclosed embodiments.

FIG. 4 is a flowchart 400 illustrating a method of registering and using the one or more resource identifiers in an enhanced audio signal. In the embodiment illustrated by FIG. 4, one or more resource identifiers used to obtain one or more resources are transmitted to a user. In FIG. 4, the one or more resource identifiers that are to be used with an enhanced audio signal and the associated resources are registered in a database, such as, for example, one or more central databases or other registries (410). An enhanced audio signal encoding the one or more resource identifiers is broadcast or otherwise transmitted (420). A local device, such as, for example, a smart phone, detects the acoustic signal, receives the enhanced audio signal, and extracts and/or decodes the embedded one or more identifiers (430).

In the embodiment of FIG. 4, the local device may send the one or more resource identifiers, or a portion or portions thereof, to the central registry to obtain information on how to access the one or more resources (440). The user device performs some appropriate and/or designated action in connection with the information provided by the central registry to obtain the resources (450), such as, for example, initiating and running an appropriate application, requesting a network resource such as a webpage corresponding to the one or more resource identifiers, generating an email, calling a telephone number, etc. In some embodiments, the appropriate and/or designated actions (450) may include, for example, resolving a URI, URN, and/or URL to an IP address, requesting a web page associated with that IP address, etc.

Figure 5:
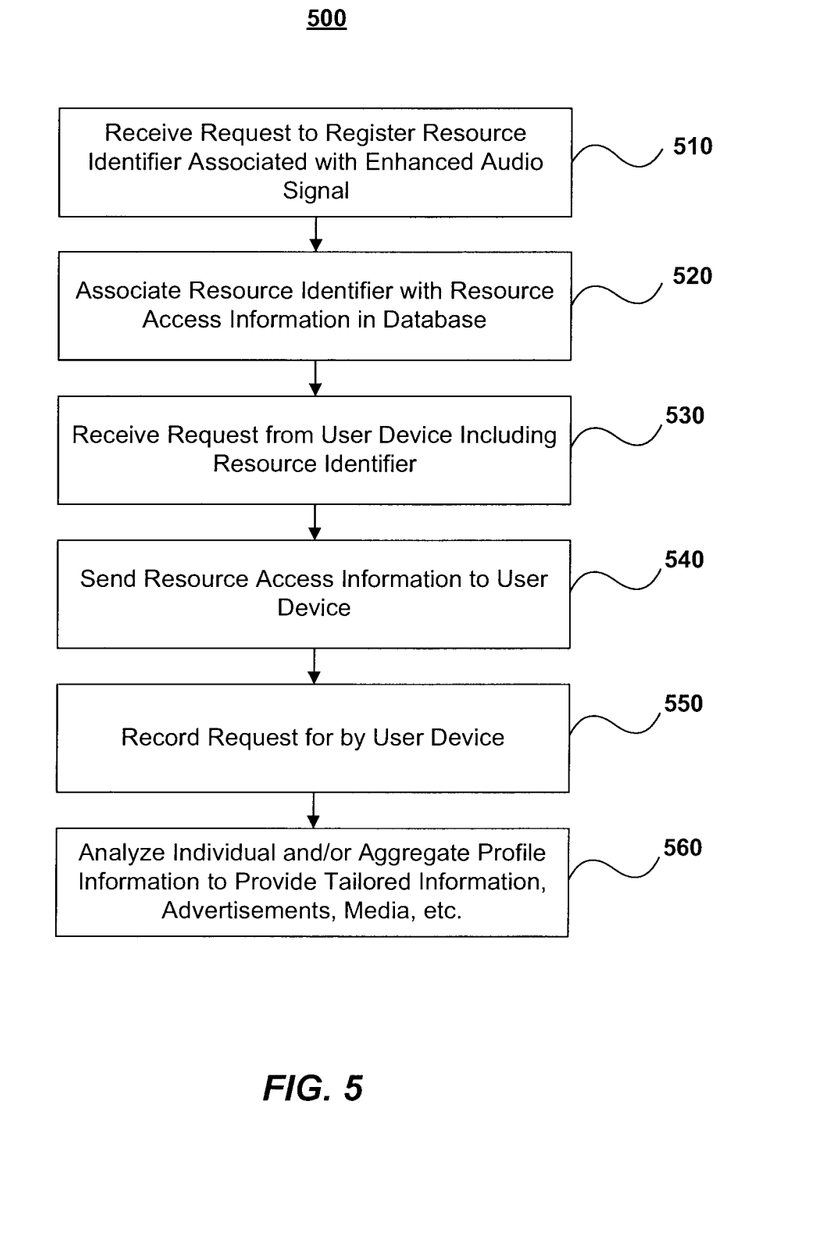
FIG. 5 illustrates an example of a process for registering and using resources and resource identifiers to be used in enhanced audio signals, consistent with certain disclosed embodiments.

FIG. 5 is a flow chart 500 illustrating a method of registering resource identifiers to be used in enhanced audio signals. Initially, a request is received to register a resource identifier (510). In some embodiments, the resource identifier may be an index into the central database and/or other registry, and may be used to obtain associated resources. The request may be sent by any type of entity, including, for example, a resource provider, such as a retailer, a marketer, or any other type of organization; or one or more individuals, etc. The central database and/or other registry associates the resource identifier with information on how to access a resource associated with the resource identifier and registers or stores this information pairing in a database (520).

Next, a request sent from a user device may be received by the central database or other registry (530). The request may include the resource identifier or a portion thereof. Next, the central database or registry resolves the resource identifier by looking up the resource identifier (or portion thereof) in the database and locating resource access information associated with the resource identifier (530), which may then be sent to the user device (540).

In some embodiments, the request may then be recorded by the central database or registry (550), for example, noting the requesting user device, the requested resource or resource identifier, the resource access information provided to the user device, the resource identifier registrant, etc. An analysis (555) may then be performed on the recorded requests to analyze individual and/or aggregate profile information in order to provide tailored information to the user, such as advertisements, media, etc. For example, the central database, software or hardware on a user device enabling the service, or another device may collect details regarding the user's activities, which may enable the central database or registry to develop intelligence on real-time response to the broadcast material, develop content consumption habits of the users, help advertisers better target commercials and content to the user, develop customized destination for each user or group of users, and perform other similar functions. For example, the central database may maintain a profile of each user and/or user device that requests identifiers obtained via enhanced audio signals.

The methods and systems described herein may be used by and incorporated in a variety of user devices, including mobile phones, IP-connected televisions, ebook readers, laptops, netbooks, and other personal computers, and may be also be beneficial when used with those devices that lack a full keyboard or other convenient text input device.

In some embodiments because the system may direct users seamlessly to a destination, an application with malicious intent or legitimate application with compromised security may redirect the user to a nefarious destination thus potentially perpetuating fraud. To combat this, software and hardware applications on the user devices may include cryptographic certificates that check for the authenticity and security of the destination resource with a central database, or other mechanisms for verifying the authenticity and/or security of a destination resource.

The following examples are provided as illustrations only, and it will be understood that they do not limit the disclosed embodiments beyond the terms in the claims appended hereto.

Broadcast Program: In one example, a user may be watching a television broadcast, such as of the Super Bowl, that is broadcast with resource identifiers. The user may desire statistics for various players or teams in the game, and may activate a resource identifier application on a mobile telephone, computer, or other electronic device. The application may receive an audio signal from a television (e.g., in the form of acoustic waves) or a broadcast antenna (e.g., in the form of an electromagnetic signal), identify and decode a resource identifier from the signal, and send the resource identifier to a central registry, such as VERISIGN™. The central registry may then translate that identifier into a relevant URL and send it back to the application, which navigates to destination webpage or site in a browser of the device.

Advertising Campaign: As another example, a marketing company may register a resource identifier for a particular product or group of products, and the resource identifier may be carried in a commercial that is transmitted via broadcast or other media transmission. A consumer listening to the commercial may be directed to a resource, e.g., a web page or website, by activating an application on their phone. In some embodiments, all commercials for a particular product or group of products may use the same resource identifier, and the user may be directed to a common webpage. In other embodiments, each commercial for a particular product or group of products may use a different resource identifier, and the user may be directed to either a common webpage or a specific webpage for each commercial.

Geolocational Advertising: In embodiments having GPS-derived geolocation information, an identifier and/or destination resource may be used in connection with geolocation information to identify stores or businesses related to the resource identifier and/or resource within a predetermined vicinity of the user device. That is, the enhanced audio signal may provide the same resource identifier to all listening devices, irrespective of location. However, each listening device may request resolution from a resolution server by providing not only the resource identifier extracted from the enhanced audio signal, but also an indication of the device's current geographic location. Accordingly, the resolution server may provide different resource access information to each requesting device depending on each device's geographic location.

Promotional Codes: As another example, the resource identifier may be a promotional code, and the encoded promotional code may be embedded within an enhanced audio signal in the form of an acoustic signal. In such an embodiment, the acoustic signal may be an advertising "jingle" or the like. The user device may be configured to decode the resource identifier and display the promotional code to the user. The user, in turn, may access a web page and may use the promotional code at the time of check-out in an e-commerce transaction to avail him/herself of discounts. For example, a DISNEY™ advertisement could have an encoded promotional code, such as, for example, "mickey55," embedded in the audio signal. The user device may decode this promotional code, and the user would be able to use this promotional code to purchase tickets to DISNEYLAND™ at a discounted price. In some embodiments, in addition to a resource identifier being a promotional code, a second resource identifier may be provided in the same acoustic signal that automatically directs the user to a purveyor of the promotional code.

Security and/or Emergency Applications: In some embodiments, the decoded resource identifier is itself useful information that could convey some message to the user or be stored in the user device for later action. The action may, in some cases be mandatory, while in others the action may not be mandatory. For example, in military applications, the resource identifier may be a command message, a secret message, a classified message, etc. to one or more soldiers and/or civilians connected to the military. As another example, during a time of crisis, such as an earthquake, volcanic eruption, tornado, etc., the resource identifier may include an alert message for one or more users.

Automatic Contest Registry and/or Voting: As still another example, the resource identifier may be associated with a web page or website associated with an online and/or broadcast contest. For example, a user may be able to cast votes for favorite contestants in television or other broadcast shows, such as, for example, AMERICAN IDOL™, AMERICA'S GOT TALENT™, or the like.

DVD/Blu-Ray: DVDs, Blu-Ray discs, or other similar media may be sold with resource identifiers embedded in one or more audio tracks of the media. As the consumer is watching the movie or listening to the DVD, the consumer can activate an application to obtain and decode a resource identifier from the acoustic signal provided by the viewing device. The resource identifier may direct the consumer to a destination webpage or site that sells merchandise associated with the movie or music.

Radio: A user listening to breaking news being broadcast with resource identifiers may want more details on the topic of the news report. The user may activate an appropriate application to capture the resource identifier, which will then direct the user to a webpage, site, or other resource that provides additional details about the news story or other event.

Device with No IP connectivity: A user may be listening to breaking news being broadcast with resource identifiers and want more details on the news story. The user may activate an application using a device that is either not connected to the Internet or cannot connect to the Internet. The application may communicate to the central database or registry via text message, e.g., SMS, MMS, etc., and receive in return a phone number to call. In some cases, such as where the user's device is a mobile phone, the software application may launch a call to the phone number provided by the central database or registry.

Another embodiment of the methods and apparatus described in this application can help enable secure zones. For example, in certain high security buildings, areas, or the like, there may be security zones at the perimeter. In such an embodiment, any device passing through the security zone may be instructed, via microwave signals or the like, to enforce a set of pre defined policies for files (documents, presentations, emails, pictures, spreadsheets, etc.) on the device. Thus, for example, codes embedded in the microwave signals can indicate to the device to disallow email forwarding, or document sharing. In such an embodiment, a user device outside the zone will not be able to access files designated as secure on the user device when the user device is not in the pre-defined secure zone. In another embodiment, codes embedded in the signals can indicate to the device to erase, disable, destroy, rewrite, or otherwise manipulate emails or other files that were acquired in the secure zone or when leaving the secure zone.

In one exemplary embodiment, a resource provider registers a first URL and a resource identifier, such as a numerical identifier, with a resolution service provider. The resolution service provider stores the first URL and the resource identifier in a central database, along with an association between the two. A transmitting device transmits an electromagnetic signal or acoustic signal that includes the resource identifier within the transmitted data. A first user device detects the resource identifier within the signal and makes an HTTP request to a resolution server that includes the resource identifier. The resolution server looks up the resource identifier in the central database to locate the first URL associated with the resource identifier, and sends the first URL back to the first user device. The first user device then sends an HTTP request to a resource provider server associated with the first URL for a resource specified by the first URL. The resource provider server then transmits a webpage associated with the first URL back to the first user device.

At a later time, the resource provider communicates with the resolution service provider or resolution server to re-associate the resource identifier with a second URL that differs from the first URL. A transmitting device transmits an electromagnetic signal or acoustic signal that includes the resource identifier within the transmitted data. A second user device detects the resource identifier within the signal and makes an HTTP request to the resolution server that includes the resource identifier. The resolution server looks up the resource identifier in the central database to locate the second URL associated with the resource identifier, and sends the second URL back to the second user device. The second user device then sends an HTTP request to a resource provider server associated with the second URL for a resource specified by the second URL. The resource provider server then transmits a webpage associated with the second URL back to the second user device. In this manner, the resource provider is able to modify which resource users may access using the resource identifier embedded in the enhanced audio signal, without changing the resource identifier itself or the enhanced audio signal.

The embodiments and the various features and advantageous details thereof are explained more fully with reference to the non-limiting embodiments and/or illustrated in the accompanying drawings and detailed in the foregoing description. It should be noted that the features illustrated in the drawings are not necessarily drawn to scale, and features of one embodiment may be employed with other embodiments as the skilled artisan would recognize, even if not explicitly stated herein. Unless defined otherwise, all technical and scientific terms used herein have the same meanings as commonly understood by one of ordinary skill in the art to which the embodiments pertain.

It is understood that the invention is not limited to the particular methodology, protocols, topologies, etc., as described herein, as these may vary as the skilled artisan will recognize. Various modifications and variations of the described methods and systems of the disclosed embodiments will be apparent to those skilled in the art without departing from the scope and spirit of the invention. Indeed, various modifications of the described modes for carrying out the invention which are obvious to those skilled in the relevant arts or fields are intended to be within the scope of the appended claims.

What is claimed is:

1. A computer-implemented method for providing access to a resource, the method comprising:
   concurrently receiving, by a microphone associated with a user device, a primary broadcast audio signal, the primary audio signal including audio content for user consumption, and an enhanced broadcast audio signal, the enhanced broadcast audio signal including a resource identifier that is encoded in the enhanced broadcast audio signal, wherein the resource identifier is associated with the resource and wherein the enhanced broadcast audio signal further includes authentication information to authenticate the resource;
   detecting, by the user device, the resource identifier within the enhanced broadcast audio signal;
   extracting, via a processor, the resource identifier from the enhanced broadcast audio signal;
   transmitting, to a resolution server, a request for access information, wherein the request includes the resource identifier that was extracted from the enhanced broadcast audio signal and location information;
   receiving, from the resolution server, the requested access information for accessing the resource via the network;
   authenticating the resource with the resolution server based on the authentication data; and
   retrieving, by the user device, the resource using the received access information.

2. The computer-implemented method of claim 1, wherein the encoded resource identifier is a watermark.

3. The computer-implemented method of claim 1, wherein the resource identifier comprises at least one of a fingerprint associated with an audio track, the resource, an index identifier, or a data string that, when further qualified by additional data, identifies the resource.

4. The computer-implemented method of claim 3, wherein retrieving the resource further comprises:
   sending, from the user device, the index identifier to the resolution server;
   receiving, by the user device, resource identifier access information from the resolution server; and
   retrieving, by the user device, the resource using the resource identifier access information.

5. The computer-implemented method of claim 3, wherein the index identifier is a unique data string.

6. The computer-implemented method of claim 3, wherein the additional data includes at least one of information associated with the device, device identifier information, or information stored on the device.

7. The computer-implemented method of claim 1, wherein the resource identifier comprises one or more of a pre-registered Uniform Resource Locator (URL), a pre-registered Uniform Resource Identifier (URI), a pre-registered Uniform Resource Number (URN), a pre-registered domain name, and a preregistered Internet Protocol (IP) address, or the resource comprises one or more of a pre-registered Uniform Resource Locator (URL), a pre-registered Uniform Resource Identifier (URI), a pre-registered Uniform Resource Number (URN), a pre-registered domain name, a pre-registered Internet Protocol (IP) address, and at least one URL.

8. The computer-implemented method of claim 1, further comprising:
   receiving, by the user device, further resource access information based on the location information.

9. The computer-implemented method of claim 1, wherein the resource is associated with a product and comprises at least one of: product/service information, an advertisement for the product or service, a map, discount information, a coupon, a game, a purchase, or a promotional code.

10. The computer-implemented method of claim 9, wherein the promotional code is displayed on the user device for use during a purchasing event of the product.

11. The computer-implemented method of claim 9, wherein the resource comprises a web page or website.

12. The computer-implemented method of claim 11, wherein the web page or website permits a user to cast a vote in a poll or a contest via the user device.

13. The computer-implemented method of claim 9, wherein the resource associated with the product provides, when executed by the user device, a chat functionality to allow a user to chat with an associate at a store containing the product.

14. The computer-implemented method of claim 1, wherein the primary or the secondary enhanced audio signal is received from at least one of a radio, a loudspeaker, a public address system, a speaker, a music device, a television, or any other appropriate transducer.

15. A non-transitory computer readable medium, storing a set of instructions, executable by a processor, to perform a computer-implemented method for providing access to a resource, the method comprising:
   concurrently receiving, by a microphone associated with a user device, a primary audio signal including audio content for user consumption and an enhanced broadcast audio signal including a resource identifier that is encoded in the enhanced broadcast audio signal, wherein the resource identifier is associated with the resource and wherein the enhanced broadcast audio signal further includes authentication information to authenticate the source;

detecting, by the user device, the resource identifier within the enhanced broadcast audio signal;

determining, via a processor, the resource identifier from the enhanced broadcast audio signal;

transmitting, to a server, a request for access information, wherein the request includes the resource identifier that was determined from the enhanced broadcast audio signal and location information;

receiving, from the server, the requested access information for accessing the resource via the network;

authenticating the resource with the server based on the authentication data; and retrieving, by the user device, the resource using the received access information.

16. The non-transitory computer readable medium of claim 15, wherein determining the resource identifier further comprises the user device detecting the resource identifier by calculating a fingerprint.

17. The non-transitory computer readable medium of claim 15, wherein determining the resource identifier comprises:

calculating, by the user device, a fingerprint of the enhanced audio signal;

sending the fingerprint to a resolution server; and receiving, by the user device, the resource identifier.

* * * * *